| United States Patent [19] | [11] 3,935,593 |
| --- | --- |
| von Tiesenhausen et al. | [45] Jan. 27, 1976 |

[54] MULTI-MEDIA PRODUCTION PROGRAMMER

[75] Inventors: Henry H. von Tiesenhausen; Carl K. Iverson, both of Vancouver, Canada

[73] Assignee: Henry H. Tiesenhausen, Vancouver, Canada

[22] Filed: Oct. 29, 1974

[21] Appl. No.: 518,463

[52] U.S. Cl. .................................. 360/39; 360/54
[51] Int. Cl.² ........................................ G11B 5/02
[58] Field of Search ............................. 360/39, 54

[56] References Cited
UNITED STATES PATENTS

| 3,439,344 | 4/1969 | Stanga | 360/48 |
| 3,711,844 | 1/1973 | Irwin | 360/48 |
| 3,765,005 | 10/1973 | Cannon | 360/40 |

*Primary Examiner*—Vincent P. Canney
*Attorney, Agent, or Firm*—Bruce L. Birchard

[57] ABSTRACT

Novel equipment utilizing a single head, single gap on a single track in an audio magnetic recorder to permit control of a large variety of audio-visual devices for the pre-programming of a multi-media presentation in educational, entertainment and other fields. Particular structure, including an audio magnetic tape drive mechanism, which permits, by means of a single head with a single gap on a single track, index signal recording, data signal recording, data signal updating and data signal playback is provided to perform multiple discrete and proportional control functions. The same magnetic tape may carry on a separate track or tracks audio information which is correlated with the functions controlled by the data recorded on the device control track.

15 Claims, 2 Drawing Figures

MULTI-MEDIA PRODUCTION PROGRAMMER

BACKGROUND OF THE INVENTION

1. Field of the Invention

This invention relates to automatic programming equipment and, more particularly, to such equipment and systems providing accurate control of multiple devices in, for example, an entertainment or educational system utilizing multi-media techniques.

2. Description of the Prior Art

In presenting a program for education or entertainment which involves the use of both audio and visual devices and effects, for example in presenting a program in a planetarium, it is a very difficult task to assure that the audible and visible effects are produced at the right instant and in the right relationship. In planetaria, for example, the lecturer is frequently charged with the task of not only presenting the description of what is being seen and heard but also must control the numerous slide projectors, star image projectors and other audio-visual equipment associated with his presentation. There has been an attempt to automate the control of the audio-visual effects, one of the most common approaches being to use punched paper tape and a reader for that tape. Such punched paper tape systems are limited in the functions they can perform for, essentially, they can only initiate an on-off action, for example a switch closure. That switch closure may then control a dissolve unit which has a pre-set fade rate to make an electric lamp fade from zero lamp level to full light level and, at an alternate command, to fade from the full light level to zero light level. Such a paper tape system may also control a slide projector. For example, at any time the light fades from full on to off the slide changer may be activated automatically. Many other programmers on the market today are essentially variations of this paper tape reading system. Some use tone encoded magnetic tape, and some use digital address codes on tape, but, again, they only control on-off functions. These programmers of the prior art cannot program a wide range of light levels for a single device.

There have been some programmers on the market that use magnetically recorded analog information, such as varying frequency, to, in turn, effect proportional light level variations. These systems require one recording channel for each device to be proportionally controlled.

Other prior art systems have used dual-gap heads or dual tracks to record digital control information. With either of these systems the making of a correction requires playing the tape from beginning to end. If corrections are made at random, gaps result causing intolerable interference in the system.

Accordingly, it is a general object of the present invention to provide improved equipment which permits multimedia programming utilizing a single magnetic recording track.

It is a further object of the present invention to provide a multi-media programmer which permits changes in the recorded program at any point without requiring re-recording of the previously recorded control information which is not changed.

It is a still further object of the present invention to provide versatile, relatively low cost multi-media programming equipment with a wide range of control in the operation of the associated audio-visual devices and in which a program can be created, if desired, by a plurality of recording passes, similar to sound-on-sound recording in audio tape recorders.

SUMMARY OF THE INVENTION

In brief, a multi-media production programmer in accordance with the present invention includes an audio tape drive mechanism and a magnetic tape of the type conventionally used for audio tape recording, on one track of which index pulses are first recorded at a rate derived from a constant source, in this case it may be a 60 Hz power source. Audio-visual device control information is recorded in digital form with 16 bits grouped together to form one word and with a sampling period including up to 16 words depending on the number of effects to be controlled. The beginning of a sampling period is indicated by three index pulses. The beginning of each word (after the first word in a sampling period) is signaled by two index pulses. A master decoder in the device measures the times slots which have a width equal to 1/20th of the time between word indexes or 1/10th of the time between half-word indexes. Time slots contain bits of data or the appropriate number of index pulses. Data "0" is the absence of a pulse in a time slot and data "1" is the presence of a pulse in a time slot. During the indexing mode the main pulse generator is synchronized from the line frequency power source and during playback the main pulse generator uses the index pulses, previously recorded, as its reference.

A word counter is provided and it responds to successive sets of dual index pulses since each such set of dual index pulses may, in one embodiment, indicate the beginning of a word. Index pulses may also be provided in the middle of a word to give greater system stability. When a triple set of index pulses is detected, the word counter will be reset since the triple set of index pulses indicates the beginning of a new sample period.

Bit counters are provided to count the time slots in a given word and those bit counters determine whether a "one" data bit has been recorded in a particular time slot or an "0" data bit, i.e., absence of a pulse exists there.

In the indexing mode, the initial stage in the operation of the system for contolling multi-media devices according to this invention, the recording tape is saturated by negative going current applied to the record-playback head. The index pulses are formed by reversing the normal current to the record-playback head for the duration of each index pulse. During the indexing mode, any previously recorded information on the tape is completely erased. When control of a particular device, for example, the turning on and off of a light, is to be effected that function is assigned to a particular word in a sampling period, for example, word one. Since the function involved is a simple on-off function, a single bit is required to perform that function. Therefore a bit is assigned to the function, for example, bit six in word one. An enabling switch corresponding to bit six, word one is closed on the master console. Simultaneously a master enabling or encoder switch on the console is closed. When the tape is put into motion, a sensing amplifier which is coupled to the record-playback head will sense the triple index pulse signaling the beginning of a sampling period, the word counter will count words and the bit counters the time slots in each word. When time slot six in word one is reached, the record logic will switch the head driver on, first with a negative going pulse with a duration of ¼ time slot length, then a positive going potential will be applied for ¼ of the time slot length followed by a negative going pulse of one half the length of the time slot. This sequence of negative and positive pulses eliminates any noise around the "one" data bit including the flyback impulse generated as the positive pulse applied to the record-playback or readwrite head is terminated. The record logic enables the head driver only for the duration of a pre-selected time slot. Therefore the data recorded on the single track can be up-dated at random without affecting any other previously recorded control bits.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENT

Figure 1:
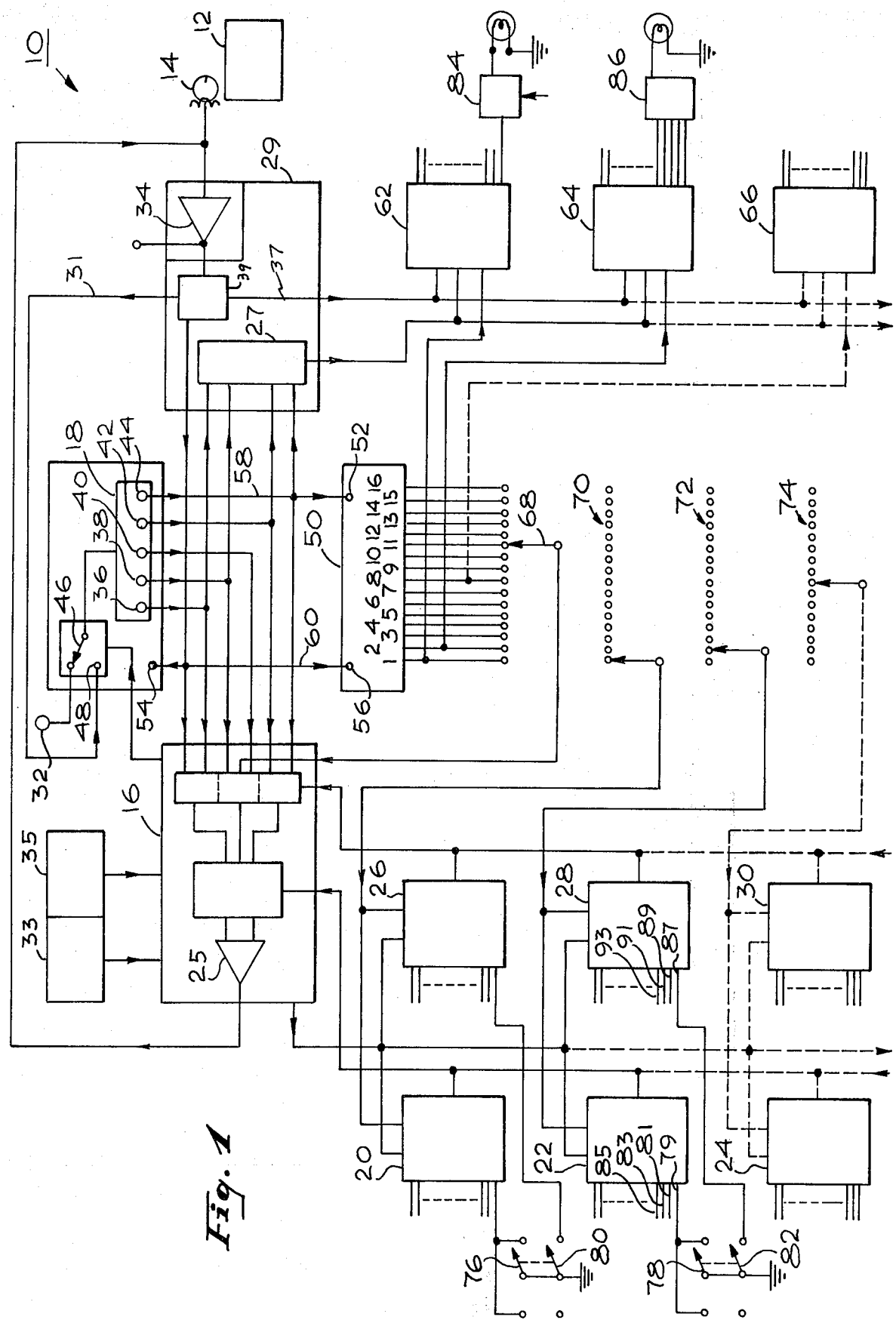
FIG. 1 is a block diagram of a multi-media production programmer according to the present invention.

In FIG. 1, a programmer 10 includes an audio tape recorder 12 having a head 14 which is adapted to record and play back control information when magnetic tape, now shown, is moved across head 14 by the tape transport mechanism (not shown) of recorder 12. Record logic 16 includes conventional coincidence gating circuits for applying to head 14 the synchronizing signals derived from the pulse generator 18 and the data signals derived from word encoders 20, 22, 24, 26, 28 and 30. The pulse generator 18 receives synchronizing information from a reference source 32 (which may be at the power line frequency of 60 Hz.) during the indexing mode of system operation. Pulse generator 18 generates a variety of pulses including index pulses. The rate of the index pulses from the pulse generator 18 may be at 2400 Hz with a 50 percent duty cycle. During the index pulse recording mode, pulses from the pulse generator 18 pass through the record logic element 16 including a head driver 25, which may be of one of a conventional solid state variety of amplifiers and need not be described in detail here. The amplified output pulses from the head driver 25 are fed to head 14 in the tape recorder 12.

Any pre-recorded index and data bits are picked up from the magnetic tape by head 14, which serves as both the record and playback head, and are coupled to sense amplifier 34 in pulse shaper and master decoding section 29 from which they pass to decoder element 39 where word-sync, sample sync and data bits are sorted out by well-known pulse counter techniques. Data pulses are fed by conductor 37 to word decoders 62, 64 and 66, for example. Clock pulses from clock pulse generator 27 are fed to the word decoders 62, 64 and 66 which are de-multiplexers commonly available in integrated circuit chip form from such companies as Texas Instruments. De-multiplexers 62 to 66 perform a serial to parallel conversion function for the data which has been recorded. Decoders 62 through 66 are coupled to loads, such as lamp switches, or digital-to-analog converters 84 and 86, depending on whether a discrete or continuously variable function is to be performed. Latching circuits may be provided between the word decoders and the loads.

A variety of pulses is derived from the generator 18. The pulses at terminal 38 are at rate "F," where "F" may be 1200 Hz. The trailing edges of these pulses count the time slots. The pulses at terminal 36 are at the rate of 2F. This is the basic frequency of the oscillator. The oscillator is synchronized from the power line, or any other reference source, through terminal 32 during the indexing mode and from the recorded indexing pulses when switch arm 46 is turned to its position in contact with terminal 48 during the encode and playback modes.

Pulse generator 18 supplies at terminal 40 a square wave having a frequency of F÷2. This signal is used to produce the index pulses.

At terminal 42 there appears a signal known as the "one-half" word signal. This signal is derived by a conventional pulse counter that counts "F" pulses and gives an output signal at the eighth count for a duration of two counts and, again at the 18th count gives an output for the duration of two counts.

The two index pulses that are gated during this two-count period synchronize the oscillator 36 at mid-word and the beginning of a successive word. This is called the ½ word pulse train.

At terminal 44 there appears a pulse train at a frequency equal to one-half the frequency of the pulse train at terminal 42. This is the "word" pulse train.

Figure 2:
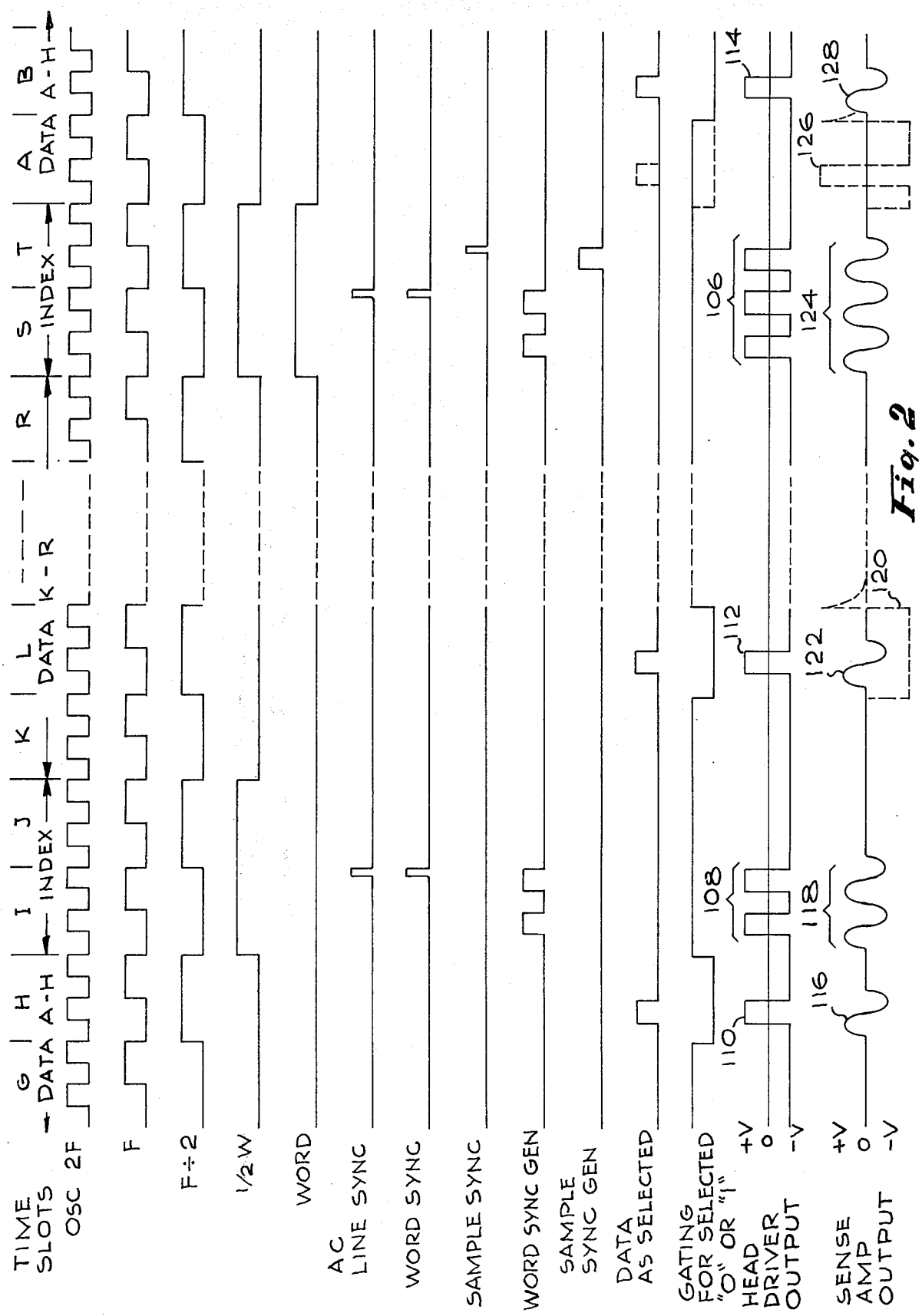
FIG. 2 is a timing diagram for the apparatus of FIG. 1.

The time relationship of these pulse trains is set forth more clearly in FIG. 2.

The word counter 50 receives timing information from the "word" pulse train by way of terminals 44 and 52, terminals 54 and 56 and the interconnecting conductors 58 and 60, respectively.

As the counter strobes its 16 word capacity, activating pulses successively pass to the word decoders 62, 64 and 66, and the others in the system. This system contemplates 16 words in a sample. If the program which is required to provide the desired functions of the loads, such as lights and slide projectors, is less than 256 bits, i.e., 16 words, selector switch arm 68 is adjusted to select the maximum number of words required and this "last word" adjustment signals the record logic 16 when a new sequence of words or a new sampling period should begin.

The word encoders 20, 22, 24, 26, 28 and 30 are basically parallel-to-serial converters. The word encoders work in pairs, i.e., 20 and 26, 22 and 28 and 24 and 30. The first of each of these pairs is a data "zero" converter and the second converter in each of these pairs is a data "one" converter. If a bit number one in a word selected by word selector switches 70 or 72 were to have data recorded in it, then pin number one on converter 20 or 22 would be grounded, as by switches 76 and 78. If pin one on "zero" converters 20 or 22 were grounded then, when converter 20 or 22 was strobed by the system's clock pulse to bit number one, an output pulse would be sent to the record logic. The duration of the pulse would be a time slot length. It should be noted that during this data recording sequence the master encoding or enabling switch 35 must be activated and indexing switch 33 disabled. If a "one" were to be recorded, then pin one on converter 26 or 28 as well as pin one on converter 20 or 22 would have to be grounded as by switches 80 or 82, respectively, in addition to closing the bit one "zero" switches 76 or 78. That is why the switches are shown ganged in FIG. 1. When the system's clock pulse gates pin one on either of the sets of multiplexers, a composite output from the respective set will be sent to the record logic. The output from the respective "zero" converter will be a negative going "clearing" pulse for the duration of one time slot and the output from the respective one converter will be a positive going pulse for the duration of ¼ a time slot as can be seen more clearly in FIG. 2.

For the purpose of illustration, word decoder 62 is shown connected to a discrete load 84, i.e., an on-off control of a lamp. On the other hand word decoder 64 is shown connected to a proportional control 86 which utilizes several bits in a word to supply a substantially continuously variable output to a load, for example a lamp to be faded. For such proportional control multiple bits would have to be used at the associated word encoders, for example the encoders 22 and 28. The separation of word sync, sample sync and data pulses in decoder element 39 is accomplished by a combination of timing and gating circuits performing a conventional frequency/pulse width discrimination function by well-known techniques which need not be described here. During recording of proportional, i.e., analogue signals, a conventional analogue-to-digital converter, for instance, would give a resolution of 64 steps. The output of this converter controls the corresponding 6 bits on the zero encoder 22 have been enabled by grounding the corresponding terminals.

Much of FIG. 2 has already been discussed. The "time slots" are merely reference time periods which help in the analysis of the operation of the system. The length of a "time slot" is 833 microseconds, i.e., a period corresponding to a repetition rate of 120 Hz. Each word in this system consists of 20 time slots. Four time slots are used for recording index pulses and 16 time slots are used for recording data. To achieve greater system stability mid-word indexing is used. In FIG. 2, time slots I and J are used for this purpose. Time slots S and T are reserved for the beginning of the next word or the beginning of the next sampling period.

"Oscillator 2F" is the basic pulse train frequency for the square wave oscillator 18 in the system. That oscillator is synchronized from the line frequency during the indexing mode of operation and from the recorded index pulses during playback. The pulse width of the data pulses corresponds to those in a square wave of frequency 2F, i.e., 208 microseconds.

The pulse train at frequency "F" is significant because the trailing edge of these pulses counts the time slots. This pulse train is derived from the pulse train at 2F by well known frequency dividing techniques which need not be described here.

The pulse train "F÷2" is derived by dividing the pulse train for "F" by two. These pulses are used to produce index pulses, as stated earlier.

The pulse train "½ W" provides the information for mid-word synchronizing. This train is derived by a counter of a well known and commonly available variety that counts the trailing edges of the pulses in "F" and provides an output at the eighth and eighteenth counts for the duration of two counts.

The "Word" train is derived by dividing the ½W train by 2. It has a frequency which is one half the ½ Word frequency.

The "A.C. Line Sync" pulse is derived from the zero crossing point of the line frequency during the indexing mode. This pulse synchronizes the basic oscillater 18 which produces the pulses at frequency 2F. Further, this pulse is also used to reset all the countdown circuits.

The "Word Sync" pulse train is derived from the index pulses during decoding and appears at line 31 in FIG. 1. It performs the same function as "AC Line Sync" only the "Word Sync" performs during the playback mode.

The "Sample Sync" pulse train is derived from the magnetic tape during playback and is shaped by the pulse shaper and master decoder 29. It denotes the beginning of a new sample period and is used to reset the word counter 50 via conductor 60. The third index pulse in the three-pulse grouping corresponding to the initiation of a new sample period resets the word counter 50.

The "Word Sync Gen" pulse train is generated in the record logic by coincidence gating of the 2F, F÷2 and ½ word trains and the setting of the "Last Word" switch arm 68. The combination of the foregoing pulse trains may be made by means of conventional coincidence gating circuits which do not form a direct part of this invention.

The "Data as Selected" pulse train is generated by gating the pulse trains 2F, F and the "Gating for Selected zero or One" pulse train which is derived from word encoders 20, 22, 24, 26, 28 and 30, and any others that may be in the system. The settings of the bit enabling switches on the word encoders determine the existence of the "zero" data pulses in this pulse train. These word encoders are parallel to serial multiplexers which are commercially available in I-C chip form from such companies as Texas Instruments (their part number 74150).

The "Head Driver Output" signal appears at the output from the head driver 25 and is a composite of the various pulse trains which have been described, as determined by the record logic 16. During the indexing mode (with control 33 engaged) the record logic 16 provides to the head driver 25 a triple index pulse 106 at the beginning of a sample period and dual pulses 108 at the half word and word intervals. The "Head Driver Output" pulse train in FIG. 2 also shows data "one" pulses 110, 112 and 114 which are generated in the word encoders and gated in the proper time sequence through the record logic 16.

The "Sense Amp Output" pulse train is a translation by the sense amplifier 34 of the signal resulting from the application of the output signal from the head driver 25 to read-write head 14. It is to be noted that sense amplifier 34 must have a wide dynamic range since it receives both the signals applied to head 14 from driver 25 and the much weaker signals previously recorded on the tape and picked up by head 14. The spacing of these signals of widely varying amplitude may be a mere time slot in time duration. The signals in the "Sense Amp output" train comprise a data "one" signal 116 corresponding to pulse 110, a pair of word index signals 118, corresponding to pulses 108, a data "zero" pulse being recorded where there was previously the data "one" pulse 122 (the recording of the "zero" involving wiping the time slot including pulse 120 clean through the use of a negative going pulse for the duration of the time slot), the data "one" pulse 122 corresponding to pulse 112, then a triple sequence of signals, 124, corresponding to sample sequence initiation pulses 106, then a data "one" pulse 126 being recorded and, finally, a data "one" signal 128 previously recorded as data "one" pulse 114.

Although there has been described hereinbefore a particular system for a multi-media production programmer in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. A digital recording system with selective updating capability including:
   a record-playback head, said head having a signal coil and a single magnetic gap;
   said signal coil being responsive to composite signals applied thereto to produce, in said gap, magnetic fields corresponding to said composite signals;
   a magnetic recording medium adapted for movement over said recording head in the region of said gap;
   a source of data signals;
   said source of data signals including a source of "one" signals and a source of clearing signals;
   a source of control signals;
   said source of data signals being coupled to said source of control signals and being responsive thereto to cause the generation of a clearing signal each time a "one" data signal is generated;
   and means for combining said data signals and certain of said control signals in a predetermined sequence for application to said signal coil.

2. Apparatus according to claim 1 in which each of said clearing signals has a time duration in excess of the duration of each of said "one" data signals.

3. Apparatus according to claim 1 in which each of said clearing signals has a time duration of four times the duration of each of said "one" data signals.

4. Apparatus according to claim 1 in which said source of control signals causes said source of data signals to initiate a clearing signal prior to the initiation of an associated "one" data signal.

5. A multi-media production programmer including:
   a plurality of word encoders,
   said plurality of word encoders including pairs of "zero" generators and "one" bit generators;
   each of said "one" bit generators being activated only in conjunction with the activation of a "zero" generator;
   means for assigning to specific word encoder pairs an external device to be controlled according to a predetermined pattern;
   means for generating control signals for said programmer;
   magnetic means having recording and reproducing modes, coupled to said word encoders and to said control signal generating means for recording and reproducing signals from said generators and certain of said control signals; and
   word decoders coupled to said magnetic recording and reproducing means and responsive to signals therefrom during the reproducing mode of said recording and reproducing means to produce output operating signals from each of said word decoders for operating said external devices according to the pattern set by said assignment to said word encoder pairs.

6. Apparatus according to claim 5 in which the signals from said "zero" signal generators are of four times the time duration of the bits from said "one" bit generators.

7. Apparatus according to claim 5 in which said signals from said "zero" generators are of opposite polarity to the bits from said "one" bit generators.

8. Apparatus according to claim 5 in which said signals from said "zero" generators are negative in polarity with respect to the bits from said "one" bit generators.

9. Apparatus according to claim 5 in which the leading edges of the bits from said "one" bit generators are delayed with respect to the leading edges of the signals from said "zero" signal generators by the width of a "one" bit.

10. Apparatus according to claim 5 which includes, in addition, word counting means responsive to signals from said control signal generating means to provide an activating signal to said word decoders.

11. The method of recording and playing back device-control information on a single magnetic track with a single recording playback gap which permits updating of selected portions of such control information without disturbing the remaining recorded control information, which includes the steps of:
   generating clearing signals of a predetermined width;
   applying said clearing signals to said single recording gap during predetermined time intervals; and
   selectively applying "one" data bits to said recording gap during said clearing signal intervals but with opposite polarity to said clearing signals.

12. The method according to claim 11 which includes the additional step of detecting by means of said gap any pre-recorded control signals for setting the sampling periods in which said clearing signals may occur.

13. The method according to claim 12 which includes the additional step of generating word synchronization pulses within said sampling periods.

14. The method according to claim 13 which includes the step of generating word sampling pulses in the middle of said sampling periods.

15. A digital recording system with selective updating capability, including:
   a combination record-playback head, said head having a single signal coil and a single magnetic gap and being adapted for the passage thereover of a magnetic recording medium;
   a source of data signals;
   a source of control signals;
   and means for applying said data signals and certain of said control signals to said single signal coil in a predetermined sequence.

* * * * *